United States Patent
Fan et al.

(10) Patent No.: US 11,409,964 B2
(45) Date of Patent: Aug. 9, 2022

(54) METHOD, APPARATUS, DEVICE AND STORAGE MEDIUM FOR EVALUATING QUALITY OF ANSWER

(71) Applicant: BAIDU ONLINE NETWORK TECHNOLOGY (BEIJING) CO., LTD., Beijing (CN)

(72) Inventors: Miao Fan, Beijing (CN); Yue Feng, Beijing (CN); Chao Feng, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

(\*) Notice: Subject to any disclaimer, the term of this patent is extended or adjusted under 35 U.S.C. 154(b) by 342 days.

(21) Appl. No.: 16/709,304

(22) Filed: Dec. 10, 2019

(65) Prior Publication Data

US 2020/0193095 A1 Jun. 18, 2020

(30) Foreign Application Priority Data

Dec. 12, 2018 (CN) .......................... 201811521213.3

(51) Int. Cl.
  *G06F 40/30* (2020.01)
  *G06F 40/279* (2020.01)
  (Continued)

(52) U.S. Cl.
  CPC ............ *G06F 40/30* (2020.01); *G06F 40/279* (2020.01); *G06N 3/0445* (2013.01); *G06N 3/0454* (2013.01); *G06N 3/08* (2013.01)

(58) Field of Classification Search
  CPC ..... G06F 40/30; G06F 40/279; G06N 3/0445; G06N 3/0454; G06N 3/08
  See application file for complete search history.

(56) References Cited

U.S. PATENT DOCUMENTS

2018/0341871 A1\* 11/2018 Maitra ................. G06N 3/0427

FOREIGN PATENT DOCUMENTS

CN 108052588 A \* 5/2018 ......... G06F 16/3329
CN 108829719 A \* 11/2018 ............ G06F 40/211
(Continued)

OTHER PUBLICATIONS

Suggu, Sai Praneeth, et al. "Hand in glove: Deep feature fusion network architectures for answer quality prediction in community question answering." Proceedings of COLING 2016, the 26th International Conference on Computational Linguistics: Technical Papers. 2016. (Year: 2016).\*

(Continued)

*Primary Examiner* — Paras D Shah
(74) *Attorney, Agent, or Firm* — Lathrop GPM LLP (57) ABSTRACT

Embodiments of the present disclosure provide a method, an apparatus, a device and a storage medium for evaluating quality of an answer. The method includes extracting a question feature expression of a question and an answer feature expression of an answer with respect to the question, the question and the answer being represented in a form of text; determining a measurement of textual quality of the answer based on the answer feature expression; determining a measurement of correlation on semantics between the question and the answer based on the question feature expression and the answer feature expression; and determining a quality score of the answer with respect the question based on the measurement of textual quality and the measurement of correlations. Therefore, a high-quality answer may be accurately obtained.

16 Claims, 4 Drawing Sheets

(51) Int. Cl.
*G06N 3/04* (2006.01)
*G06N 3/08* (2006.01)

(56) References Cited

FOREIGN PATENT DOCUMENTS

| CN | 108846077 A | * | 11/2018 | ............. G06F 40/30 |
|---|---|---|---|---|
| EP | 2819031 A4 | * | 3/2013 | ......... G06F 16/3329 |
| JP | 107330130 | * | 7/2017 | ....... G06F 16/90332 |
| WO | WO-2018157805 A1 | * | 9/2018 | ............. G06F 16/00 |
| WO | WO-2019012908 A1 | * | 1/2019 | ......... G06F 16/3329 |

OTHER PUBLICATIONS

Ma, Jiajia, Chao Che, and Qiang Zhang. "Medical answer selection based on two attention mechanisms with birnn." MATEC Web of Conferences. Vol. 176. EDP Sciences, 2018. (Year: 2018).*

* cited by examiner

METHOD, APPARATUS, DEVICE AND STORAGE MEDIUM FOR EVALUATING QUALITY OF ANSWER

CROSS REFERENCE TO RELATED APPLICATION

This application claims priority and benefits to Chinese Application No. 201811521213.3, filed on Dec. 12, 2018, the entire content of which is incorporated herein by reference.

TECHNICAL FIELD

The present disclosure relates to a field of interaction technology, and more particularly, to a method, an apparatus, a device and a storage medium for evaluating quality of an answer.

BACKGROUND

With the development of network technology, more and more internet platforms support a generation of user-generated content (UGC). Such content includes social quiz, social comment, content sharing, and the like. Questions and answers are natural forms for human to learn knowledge, as well as mediums for effectively exchanging and sharing information.

SUMMARY

Embodiments of the present disclosure provide a method for evaluating quality of an answer. The method includes extracting a question feature expression of a question and an answer feature expression of an answer with respect to the question, the question and the answer being represented in a form of text; determining a measurement of textual quality of the answer based on the answer feature expression; determining a measurement of correlation on semantics between the question and the answer based on the question feature expression and the answer feature expression; and determining a quality score of the answer with respect to the question based on the measurement of textual quality and the measurement of correlation.

Embodiments of the present disclosure further provide an electronic device. The electronic device includes one or more processors and a memory configured to store one or more programs. When the one or more programs are executed by the one or more processors, the one or more processors implement the above method.

Embodiments of the present disclosure further provide a computer readable storage medium having computer program stored thereon. When the program is executed by the processor, the above method is implemented.

It is to be understood that the content of the present disclosure is not intended to limit the key or important characteristics of the embodiments, or the scope of the present disclosure. Additional characteristics of the present disclosure will be readily understood by the following description.

BRIEF DESCRIPTION OF THE DRAWINGS

The foregoing and/or additional features, aspects and advantages of embodiments of the present disclosure become obvious and easily understood in following descriptions with reference to accompanying drawings. Throughout the drawings, the same or similar reference numbers indicate the same or similar elements, in which.

DETAILED DESCRIPTION

Embodiments of the present disclosure will be described in more detail below with reference to the accompanying drawings. Although certain embodiments of the present disclosure are shown in the drawings, it should be understood that the present disclosure may be embodied in various forms and should not be construed to be limited to the embodiments set forth herein. The embodiments are provided to provide a clear and complete understanding of the present disclosure. It should be understood that, embodiments and drawings of the present disclosure are merely exemplary and do not intent to limit the scope of the present disclosure.

In the description of the embodiments of the present disclosure, the term "include" and the like are to be understood as open-ended, that is, "including but not limited to". The term "based on" should be understood as "at least partly based on". The term "one embodiment" or "the embodiment" should be understood as "at least one embodiment". The terms "first", "second", and the like may refer to different or identical object. Other explicit and implicit definitions may also be included below.

With raising of economic level, people gradually pay attention to the improvement of their self-knowledge level and take this improvement as a lifelong learning task. Due to convenience of communication between people via the Internet, questions and answers on the interne platform have become a convenient way for people to obtain information and knowledge. However, people also face a difficulty of screening high-quality knowledge from a large number of answers.

In a knowledge-paid application, users can pay fees to ask a question to a trusted or professional person or institution to obtain an answer of a high quality. However, because there are a small number of trusted or professional people and institutions, a coverage of answers and the number of answers are limited. In addition to the knowledge-paid application that allows a small number of refined questions and answers, people can also achieve an economical and even free interaction of question provision and answer acquisition on many social sites to realize a social interaction that allows a large number of all-embracing questions and answers. Such sites often allow a user to provide an answer, based on his knowledge and experience, to a question asked by another user. In this way, a large amount of questions and answers may be provided. However, due to the lack of a restriction mechanism, the answers may be greatly deviated from real answers. For example, since anyone can post content that he/she wants to post, some users may provide an "answer" to a question for seeking entertainment or certain benefit, independent of a real answer to the question. In addition, depending on the user's knowledge and expression ability, quality of answers varies with the users. Therefore, it is desirable to evaluate the quality of an answer to distinguish a high-quality answer from a low-quality answer.

Therefore, it is desirable to evaluate the quality of an answer of a question to distinguish the high-quality answer from a low-quality answer. In a conventional solution, user voting may be used to obtain the high-quality answer. For example, by providing a "LIKE" function for each answer to encourage the user to vote on his/her satisfactory answer through this "LIKE" function, the high-quality answer may be distinguished from other answers. However, this solution has some drawbacks. Efficiency of this solution may be affected by a time factor. For example, on many websites, according to an existing mechanism, a new answer provided by the user to a question may be displayed at the end of an answer list. In most cases, users tend to browse the answer list from the top to the bottom. As a result, a possibility of seeing an answer generated late in the time dimension may be lower than that of seeing an answer generated early, such that the high-quality answer provided late may be missed and the high-quality answer may obtain a low vote. In addition, this "all-embracing" mechanism for filtering answers is also limited by an influence of group psychology. It is observed that a high voted answer is prone to get more votes, resulting in that each answer may not be feedback by all users fairly and objectively, especially for the one post late.

Although some schemes are developed for automatically evaluating the quality of answers, these schemes rely largely on a large number of linguistical analysis tools. Specifically, many schemes may use different linguistical analysis tools to perform textual analysis on questions and answers and manually select and extract features on different levels, such as part-of-speech tagging, grammar, emotion, semantic features of the questions and answers. The manually selected and extracted features may be used to train machine learning classification models such as support vector machine (SVM) and random forest. The trained models may be used to evaluate the quality of the answers.

In general, conventional schemes for automatically evaluating values rely on the linguistical analysis tools, leading to many limitations. With many linguistical analysis tools, it is difficult to guarantee the accuracy of analysis of target language. In addition, an application scenario with multi-type language may bring a cost of purchase and development on the linguistical analysis tools. Furthermore, whether the features extracted via the linguistical analysis tools is advantageous or not to the evaluation of the quality of the answer is not settled. Even if some effective features may be defined by professors, these schemes may be limited to a specific language environment, resulting in insufficient universality. Therefore, these schemes often fail to accurately find the high-quality answers.

With the in-depth study and application of deep learning, textual features of the questions and answers may be extracted automatically by a neural network. These features may be used to train a pre-designed algorithm model. The trained model may be used to obtain the high-quality answers. However, the inventors found that an existing neural network as a "black box" only focuses on a correlation between answers and questions and outputs the quality of the answer accordingly. However, for some particular questions, an answer having a close correlation with the question is difficult to considered as a high-quality answer.

According to embodiments of the present disclosure, a solution for automatically evaluating quality of an answer is provided. In this solution, a question feature expression of the question and an answer feature expression of the answer may be extracted. The answer feature expression may be used to measure textual quality of the answer, and the question feature expression of the question and the answer feature expression of the answer are used together to measure a correlation on semantics between the answer and the question. A quality score of the answer may be determined based on the textual quality and the correlation. In this way, the quality score of the answer with respect to the question may be measured from at least two aspects, i.e., the quality of the answer itself and the correlation between the answer and the question, thereby accurately distinguishing the high-quality answer from other answers.

Embodiments of the present disclosure will be described in detail with reference to the drawings.

Figure 1:
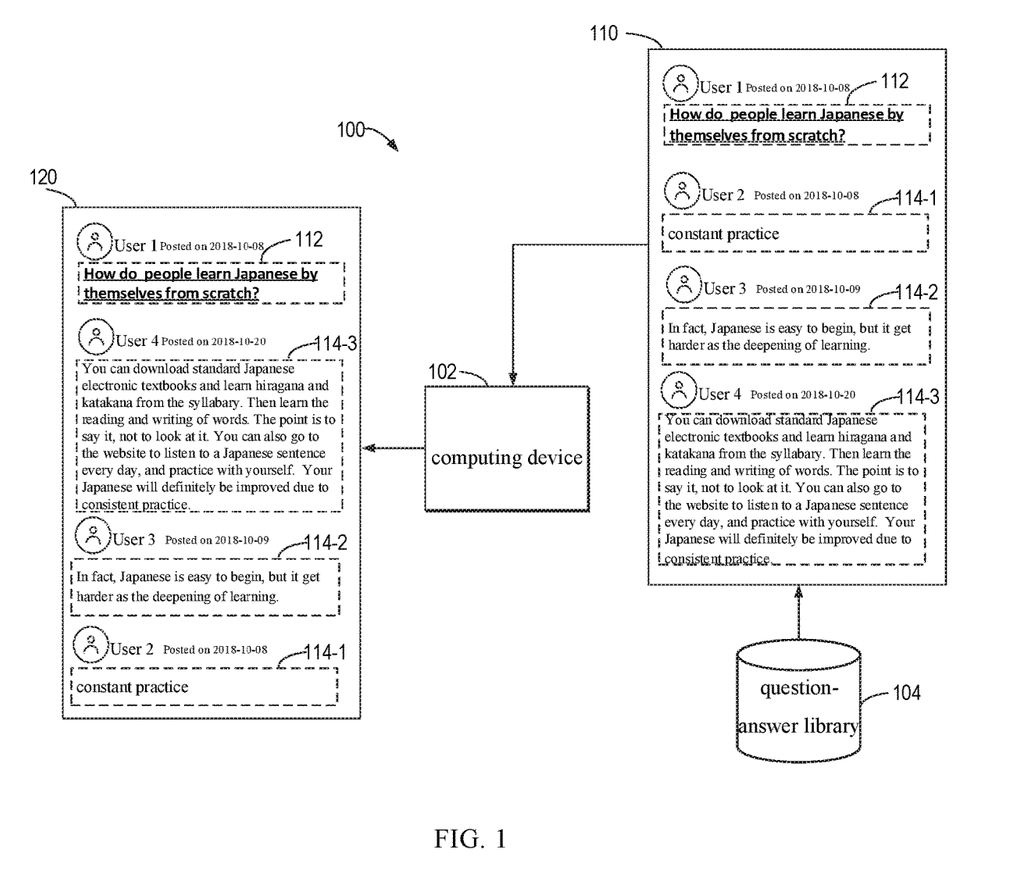
FIG. 1 is a schematic diagram illustrating an exemplary environment for implementing embodiments of the present disclosure.

FIG. 1 is a schematic diagram illustrating an exemplary environment 100 for implementing embodiments of the present disclosure. In the exemplary environment 100, a computing device 102 may be configured to evaluate the quality of an answer with respect to a certain question.

In embodiments of the present disclosure, the answer refers to a response to a certain question. The answer can also be called as a message, a reply, a suggestion, a review, an opinion, and the like. Questions and answers may be usually written by users and submitted to a specific website host. In embodiments of the present disclosure, discussions will be made based on comments given in a form of text. In some cases, the comments may include content presented in a form of audio, video, pictures, and the like. For these situations, the content in the form of audio, video and pictures may be converted to the form of text for processing.

The computing device 102 may be configured to obtain a question and one or more answers with respect to the question from a question-answer library 104. Such a question-answer combination may be obtained from a variety of sources and may be presented or stored in any manner/structure. For example, the question-answer combination may be presented on a web page of a quiz website. In an example of FIG. 1, the computing device 102 may be configured to obtain a web page 110 from the question-answer library 104. The web page 110 may include a question 112 and multiple answers 114-1, 114-2, and 114-3 (for ease of description, referred to as the answers 114) with respect to this question. It should be understood that although multiple answers are shown, in some cases there may be a single answer with respect to a question.

The computing device 102 may be configured to extract the question 112 and the one or more answers 114 correspondingly from the web page 110 and determine a quality score for each of the one or more answers 114 with respect to the question 112 according to embodiments of the present disclosure. In embodiments of the present disclosure, the quality score of the answer 114 with respect to the question 112 may indicate the quality by taking the answer 114 as the answer to the question 112. The computing device 102 may be configured to output a quality evaluation result of the answer 114, i.e., the quality score determined.

The answers 114 may be categorized into different discrete categories corresponding to different quality levels, according to the quality scores of the answers 114. For example, there are two quality levels including a level of high-quality answers or a level of low-quality answers. In an example, there may be three or more other quality levels. The quality score may be configured to indicate the quality of the answer 114 with a value within a continuous value range. The quality score of the answer 114 may be used for a variety of purposes. In an example, the quality score of the answer 114 may be used to determine a presentation form of the answer 114 such that the high-quality answer may be highlighted or may be presented in a different manner from that for presenting the low-quality answer. FIG. 1 illustrates a case that the quality score of each of the answers 114 determines an order of presenting the answers 114. In detail, the computing device 102 may be configured to output the web page 120 based on the quality scores of the answers 114. Compared with the web page 110, the computing device 102 adjusts the order of presenting the answers 114 in the web page 120. In the web page 110, multiple answers 114 are presented from the top to the bottom in an order of posted time. Based on the quality scores of the answers, the answer 114-3 that is posted late but has a high quality may be presented at a upper portion of the web page 120, while the answer 114-1 that is posted early but has a low quality may be presented at a lower portion of the web page 120.

In addition to the presentation form of the answer 114, the quality score of the answer 114 may also affect various other decisions, such as the award of the publisher of the answer 114, the promotion of the answer 114 and/or the question 112. The scope of the embodiments of the present disclosure is not limited in this respect.

It should be understood that the web pages 110 and 120 illustrated in FIG. 1 are merely examples, and FIG. 1 illustrates a possible application scenario according to embodiments of the present disclosure. In other embodiments, the computing device 102 may be configured to receive textual content of questions and answers, rather than the web pages carrying the questions and answers, and provide the quality scores of the answers. Such evaluation on the quality of the answer may be implemented by an internet platform providing questions and answers, or by a third-party provider.

Figure 2:
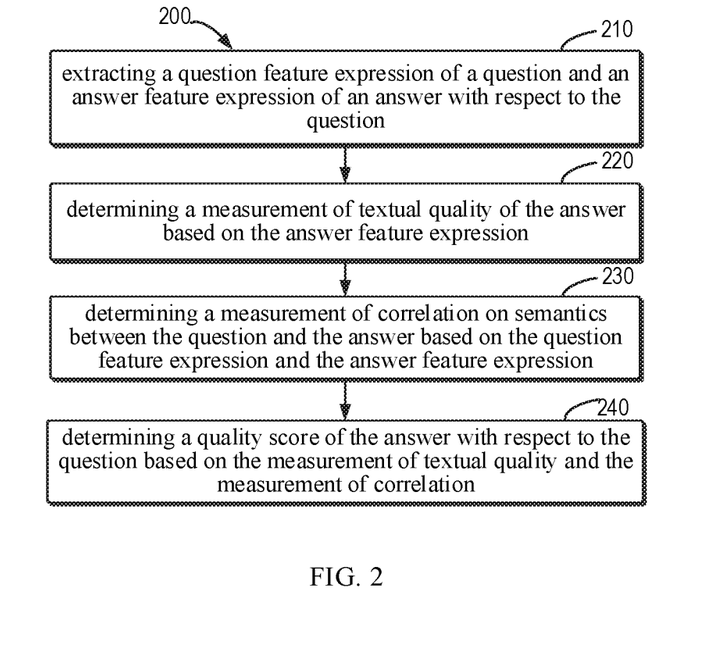
FIG. 2 is a flowchart illustrating a method for evaluating quality of an answer according to embodiments of the present disclosure.

In order to clearly understand the method for evaluating quality of an answer according to embodiments of the present disclosure, a detailed description will be made with reference to FIG. 2. FIG. 2 is a flowchart illustrating a method 200 for evaluating quality of an answer according to embodiments of the present disclosure. The method 200 may be implemented by the computing device 102 illustrated in FIG. 1. For ease of discussion, the method 200 will be described with reference to FIG. 1.

At block 210, the computing device 102 extracts a question feature expression of a question 112 and an answer feature expression of an answer 114 with respect to the question 112. The evaluation on a quality score of the answer 114 may be described below. The question 112 and the answer 114 may be in a form of text. That is, the question 112 may include text of one or more words, and the answer 114 may include text of one or more words. The text of the question 112 and the text of the answer 114 may be represented in any same or different language.

For extracting features, the computing device 120 may be configured to vectorize the question 112 and the answer 114 to obtain a first vectorized expression and a second vectorized expression. The question feature expression and the answer feature expression may be extracted based on the first vectorized expression and the second vectorized expression.

For determining the vectorized expressions, the computing device 102 may be configured to divide the questions 112 and the answers 114 based on a certain granularity to obtain one or more textual items, and determine the vectorized expression corresponding to each of the textual items. In some embodiments, the granularity used to obtain the textual items may be related to the language of the text of the questions 112 and the answers 114. For example, if the question 112 or the answer 114 includes a word spelled by Latin letters, such as English, French, German, the question 112 or the answer 114 may be divided based on a word granularity to obtain the textual items, such that each textual item may include words contained in the question 112 or the answer 114. If the question 112 or the answer 114 includes pictographs, such as Chinese, Japanese, the question 112 or the answer 114 may be divided based on a phrase (or vocabulary) granularity, such that each textual item may include a set of words (including one or more words) contained in the question 112 or the answer 114. For the text that is unable to be divided by a specific identifier (such as a space), such as Chinese, Japanese, word segmentation tools may be used to divide the text to obtain the textual items. It may be appreciated that the question 112 or the answer 114 may also be divided based on other granularities, as desired, to obtain the textual items. The number of the textual items depends on the specific content contained in the question 112 or the answer 114.

The vectorized expression of the textual item may also be referred to as a vector coding of the textual item. Each vectorized expression of the textual item may include multiple values of a certain dimension. Different vectorized expressions of the textual items may have a same dimension, but different values. A similarity between the vectorized expressions of the textual items may indicate a semantic similarity between different textual items. In embodiments of the present disclosure, by mapping the text to the vectorized expressions, influence caused by difference among languages may be effectively reduced, to reduce application limitations. In some examples, the vectorized expressions of the textual items may be obtained from a predefined vector coding set (codebook). The predefined codebook may be the vectorized expression of each textual item determined by encoding the textual items included in the lexicon.

At block 220, the computing device 102 determines a measurement of textual quality of the answer 114 based on the answer feature expression. According to embodiments of the present disclosure, the textual quality of the answer may be taken into account in response to determining whether the answer 114 is a high-quality answer with respect to the question 112. The quality of the answer in a textual expression aspect may affect the quality score of this answer. In some cases, an answer may be highly correlated with the question, which solves the questioner's doubts to some extents. However, since the answer is not a high-quality answer due to the low textual quality of the answer having text-related defects, such as, wrong words, grammatical errors, and redundant expressions. Such answer is less likely to be selected as the high-quality answer.

At block 230, the computing device 102 determines a measurement of correlation on semantics between the answer 114 and the question 112 based on the answer feature expression and the question feature expression. A good answer is usually highly relevant to the question and may provide a solution to the question, rather than providing an irrelative answer to the question. Therefore, the correlation on semantics of the answer with respect to the question may also affect the quality score of the answer 114. At block 240, the computing device 102 determines the quality score of the answer 114 with respect to the question 112 based on the measurement of textual quality and the measurement of correlation on semantics. In embodiments of the present disclosure, a correspondence among the measurement of textual quality, the measurement of correlation on semantics and the quality score of the answer with respect to the question may be established. Based on the correspondence, the measurement of textual quality and the measurement of correlation on semantics determined from a pair of the answer 114 and the question 112 may be mapped to the quality score.

From the above, an overall solution for evaluating quality of an answer according to the embodiments of the present disclosure is provided. By taking both the measurement of textual quality and the measurement of correlation on semantics between the answer and the question into account, the evaluation on the quality of the answers is accurate, thereby facilitating to determine a high-quality answer satisfying requirements.

In some embodiments, extracting the feature expression, determining the textual quality, determining the measurement of correlation, and/or determining the quality score as mentioned above may be implemented with a learning network. Therefore, the learning networks for implementing the above processes may be integrated into an architecture of an end-to-end learning network. A main purpose of this learning network is to determine the quality score of the answer with respect to the question from entered questions and answers and use the quality score as an output.

Figure 3:
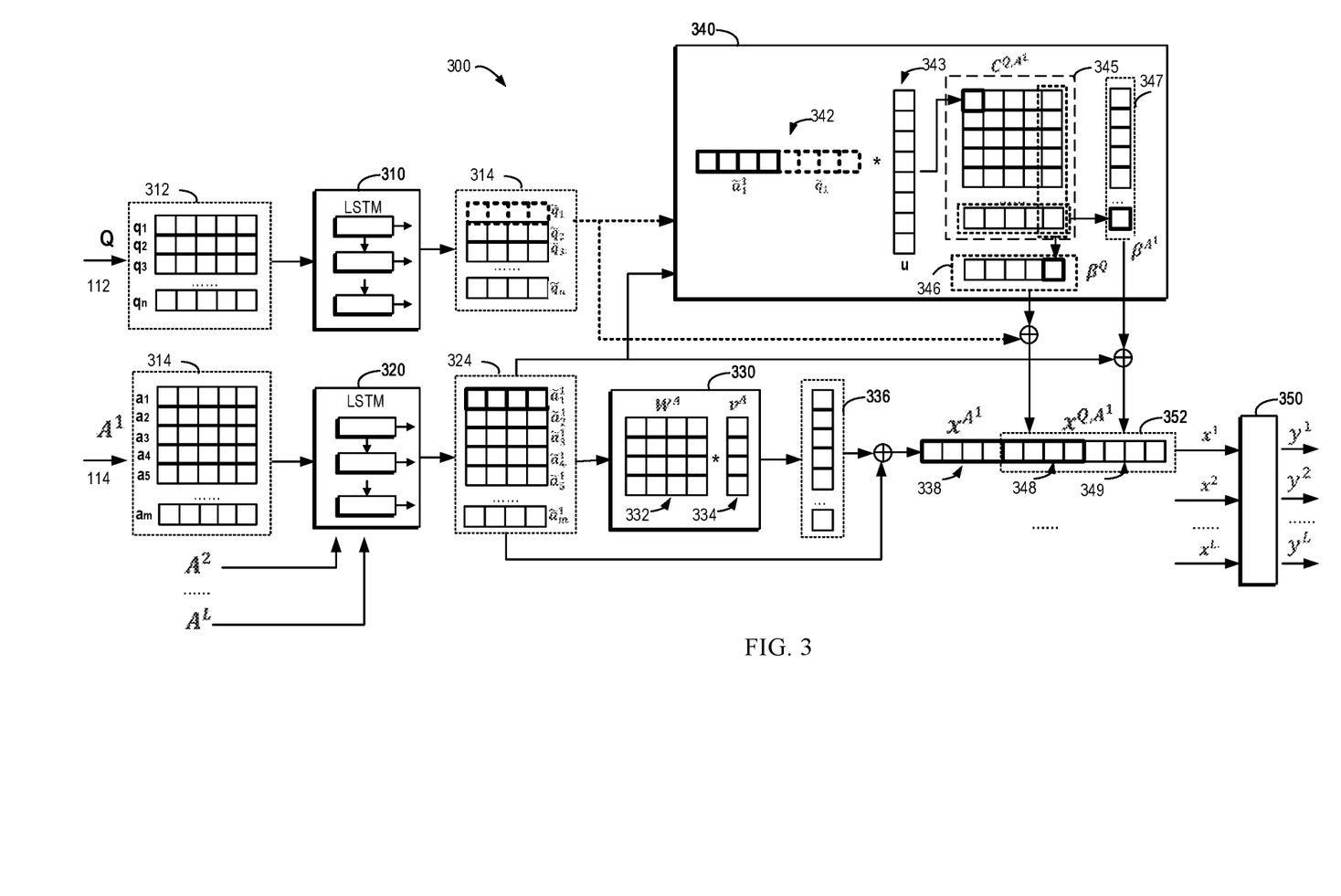
FIG. 3 is a schematic diagram illustrating framework of a learning network for evaluating quality of an answer according to embodiments of the present disclosure.

FIG. 3 is a schematic diagram illustrating a framework of a learning network 300 for evaluating quality of an answer according to embodiments of the present disclosure. As used herein, the term "learning network" refers to a model that is capable of learning, from training data, a correlation between inputs and outputs, thereby processing a given input based on a set of trained parameters after the training is completed to generate a corresponding output. The "learning network" may also be referred to as "neural network", "learning model", "network", or "model". These terms may be used interchangeably herein.

Operations of the learning network 300 illustrated as FIG. 3 may be implemented by the computing device 102 of FIG. 1. For ease of description, the exemplary architecture of FIG. 3 may be described with reference to FIG. 1. It is assumed that in the learning network 300, the set of parameters used by the model for processing are obtained through the training and may be used for evaluating the quality of the answer. As illustrated in drawings, the learning network 300 may include a feature extracting model 310 configured to extract a question feature expression of a question, a feature extracting model 320 configured to extract an answer feature expression of an answer, an importance evaluating model 330 configured to evaluate textual quality of the answer, a correlation evaluating model 340 configured to evaluate a correlation between the answer and the question, and a quality evaluation model 350 configured to evaluate the quality.

In usage, the computing device 102 is configured to obtain a vectorized expression 312 (denoted as Q, sometimes also referred to as a first vectorized expression) of the question 112 as an input of the feature extraction model 310. For example, the question 112 is divided into n textual items, the vectorized expression 312 may include vector coding corresponding to each of then textual items, that is, $Q=q_1,q_2,q_3, \ldots ,q_n$, where $Q \in \Re^{n \times d}$, $q_k$ represents the vector coding of a $k^{th}$ textual item of the question 112, $q_k \in \Re^d$, d represents a dimension of the vector coding, i.e., each textual item may be represented by a vector composed of d elements. The feature extraction model 310 may be configured to extract the question feature expression 314 (denoted as $\tilde{Q}$) from the vectorized expression 312, where $\tilde{Q}=(\tilde{q}_1,\tilde{q}_2,\tilde{q}_3, \ldots ,\tilde{q}_n,)$, $\tilde{Q} \in \Re^{n \times h}$, $\tilde{q}_k$ represents a $k^{th}$ vector coding extracted by the character extraction model 310 and corresponding to the kth textual item of the question 112, $\tilde{q}_k \in \Re^h$, h is a dimension of the vector coding extracted by the feature extraction model 310 and is related to a structure of the model 310.

The feature extraction model 310 may be constructed as multiple types of neural network models, as long as it may be used to extract textual features. In some embodiments, the feature extraction model 310 may be a long short-term memory (LSTM) model, also referred to as a first LSTM model. FIG. 3 illustrates that the feature extraction model 310 is implemented as the LSTM model. Thus, $\tilde{Q}=(\tilde{q}_1,\tilde{q}_2,\tilde{q}_3, \ldots , \tilde{q}_n,)=LSTM(Q)=LSTM(q_1,q_2,q_3, \ldots ,q_n)$. The LSTM model has a set of trained parameters and is configured to map the vectorized expression Q of the answer 114 to the answer feature expression $\tilde{Q}$. In an embodiment employing the LSTM model, the dimension h of each vector coding of the question feature expression 314 may correspond to the number of neurons of a hidden layer in the LSTM model.

With the LSTM model, a sequential correlation between the textual item and other textual items in the question 112 may be taken into account during extracting features of each textual item. For example, the correlation between the textual item and previous one or more textual items or the correlation between the textual item and later one or more textual items may be taken into account, such that contextual semantics of the question 112 may be considered. Thus, the extracted question feature expression 314 and the contextual semantics of the question 112 may be used together to accurately characterize the question 112. It should be understood that the LSTM model is an example. The feature extraction model 310 may be another model for extracting features, such as a recursion neural network, a convolutional neural network, and the like. The scope of embodiments of the present disclosure is not limited in this respect.

Similarly, the computing device 102 may be configured to obtain a vectorized expression of the answer 114 to be evaluated as an input of the feature extraction model 320. For a single question 112, if there are multiple answers 114 (for example L answers) to be evaluated, the vectorized expression of each answer may be sequentially input into the feature extraction model 320 to extract the corresponding feature expression. Only a vectorized expression 314 of the answer 114 (denoted as $A^i$, sometimes also referred to as the second vectorized expression) is illustrated in FIG. 3. For example, the answer 114 is divided into m textual items, and the vectorized expression 114 includes vector coding corresponding to the m textual items. That is, $A^i=(a_1^i,a_2^i,a_3^i, \ldots ,a_m^i)$, where $A^i \in \Re^{m \times d}$, and $a_j^i \in \Re^d$, where, d represents a dimension of the vector coding, i.e., each textual item may be represented by a vector composed of d elements.

The feature extraction model 320 may be configured to extract the answer feature expression (denoted as $\tilde{A}^i$) from the vectorized expression of the input answer 114, where $\tilde{A}^i=(\tilde{a}_1^i,\tilde{a}_2^i,\tilde{a}_3^i, \ldots ,\tilde{a}_m^i)$, $\tilde{A}^i \in \Re^{m \times h}$, $\tilde{a}_k^i$, represents a $k^{th}$ vector coding extracted by the feature extraction model 320 and corresponding to ae $k^{th}$ textual item in the answer 114, $\tilde{a}_k^i \in \Re^h$, h is a dimension of the vector coding extracted by the feature extraction model 320 and is related to a structure of the model 320. FIG. 3 illustrates that the answer feature expression 324 is extracted from the vectorized expression 314 of the answer 114 ($\tilde{A}^1$), where $\tilde{A}^1=(\tilde{a}_1^1,\tilde{a}_2^1,\tilde{a}_3^1, \ldots ,\tilde{a}_m^1)$. For each answer, such as each of $\tilde{A}^2$ to $\tilde{A}^L$, the answer feature expression may be extracted similarly. It should be understood that although the dimension of $\tilde{a}_k^i$ is set herein to be same as the dimension of $\tilde{q}_k$, in other examples, depending on the configurations of the feature extraction models 310 and 320, the dimension of $\tilde{a}_k^i$ may be different from the dimension of $\tilde{q}_k$. Hereinafter, for convenience of description, the description is made where the dimensions of $\tilde{a}_k^i$ and $\tilde{q}_k$ are same.

The feature extraction model 320 may be constructed as multiple neural network models, as long as it may be used to extract textual features. In some embodiments, the feature extraction model 320 may be a LSTM model which may be also referred to as a second LSTM model. FIG. 3 illustrates that the feature extraction model 320 is implemented as the LSTM model. Thus, $\tilde{A}^i = (\tilde{a}_1^i, \tilde{a}_2^i, \tilde{a}_3^i, \ldots, \tilde{a}_m^i) = \text{LSTM}(A^i) = \text{LSTM}(a_1^i, a_2^i, a_3^i, \ldots, a_m^i)$. The LSTM model has a set of trained parameters and is configured to map the vectorized expression $A^i$ of the answer 114 to the answer feature expression $\tilde{A}^i$. In an embodiment where the LSTM model is used, the dimension h of each vector coding of the answer feature expression 324 may correspond to the number of neurons of the hidden layer in the LSTM model.

With the LSTM model, the contextual semantics of the textual item of the answer 114 may be taken into account during extracting features of each textual item. The extracted answer feature expression 324 and the contextual semantics of the answer 114 may be used together to accurately characterize the answer 114. It should be understood that the LSTM model is an example. The feature extraction model 320 may be other models for extracting features, such as a recurrent neural network, a convolutional neural network, and the like. The scope of embodiments of the present disclosure is not limited in this respect. The feature extraction model 310 and the feature extraction model 320 may be separated models and may be individually trained and have the set of parameters respectively. The feature extraction models 310 and 320 may be different when being constructed as the LSTM model.

In some embodiments, in order to determine the textual quality of the answer 114, the computing device 102 may be configured to apply a "single step attention mechanism" to focus on or highlight features of important textual items in the answer 114, while ignoring features of unimportant textual items. This may be achieved by the importance evaluating model 330. In detail, the importance evaluating model 330 may be configured to determine an importance of each textual item in the answer 114 in the context of the answer 114. The importance evaluation model 330 may be configured to perform an importance evaluation based on the answer feature expression 324. The importance is used such that the semantic features of a subset of textual items having a high importance may provide a high contribution to a result of evaluation on the quality of the answer, while semantic features that are less effective may have a small impact on the evaluation of the quality of the answer. In this way, the accuracy of the quality evaluation result may be improved.

In operation, the importance evaluation model 330 has a set of trained parameters and is configured to map each feature element, from the answer feature expression (e.g., the answer feature expression 324), corresponding to each textual item of the answer 114, such as $\tilde{a}_1^i, \tilde{a}_2^i, \tilde{a}_3^i, \ldots, \tilde{a}_m^i$, to a value range of the importance. For example, an activation function of the importance evaluation model 330 may be a Tanh activation function. The result may be mapped to a specific value range using Softmax function. The processing of the importance evaluation model 330 may be represented as follows:

$$\gamma_j^i = \text{softmax}((v^A)^T \tanh(W^A \tilde{a}_j^i)) \quad (1)$$

where $$\tanh(x) = \frac{e^x - e^{-x}}{e^x + e^{-x}}, \text{ and } \text{softmax}(z_j) = \frac{e^{z_j}}{\sum_{k=1}^{K} e^{z_k}}.$$

In the formula (1), $\gamma_j^i$ represents the importance of a $j^{th}$ textual item in the context of an $i^{th}$ answer. The set of parameters 332 $W^A$ and the set of parameters 334 $v^A$ may be used by the importance evaluation model 330 to map the inputted answer feature expression to an output of an important degree, where $v^A \in \Re^h$ and $W^A \in \Re^{h \times h}$. The importance of each textual item of each answer in the context of the answer may be determined. FIG. 3 illustrates an expression 336 of the importance of each textual item of answer $A^1$ based on the answer feature expression 324.

The computing device 102 may be configured to determine a measurement of textual quality of the answer 114 by weighting the feature elements in the answer feature expression with the importance, which may be expressed as follows:

$$x^{A^i} = \sum_j \gamma_j^i \tilde{a}_j^i \quad (2)$$

where, $x^{A^i}$ represents the measurement of textual quality of the $i^{th}$ answer, and $x^{A^i} \in \Re^h$. FIG. 3 illustrates weighting the answer feature expression 324 using the importance to determine the measurement $x^{A^1}$ of the textual quality 338 of the answer 114 $A^1$.

It should be understood that although the processing of the importance evaluation model 330 is described above by taking the Tanh activation function and the Softmax normalized output function as an example, in other examples, other types of activation functions and output functions may be employed by the importance evaluation model 330. The scope of embodiments of the present disclosure is not limited in this respect.

The question feature expression 314 and the answer feature expression of each answer 114 (e.g., the answer feature expression 324) may be provided to the correlation evaluation model 340 for evaluating the correlation between the answer 114 and the question 112. The question feature expression of the question 112 and the answer feature expression of the answer 114 may characterize the question 112 and the answer 114 respectively to some extent. Therefore, the correlation evaluation model 340 may be configured to determine whether the question 112 and the answer 114 are semantically related, i.e., determine the semantic matching or similarity.

In some embodiments, the correlation evaluation model 340 may be configured to determine a set of item-level correlations between the answer 114 and the question 112 on a level of textual item based on the question feature expression 314 and the answer feature expression (e.g., the answer feature expression 324). The set of item-level correlations includes elements arranged in rows and columns. Each element may be used to indicate the correlation of one textual item of the answer with respect to a textual item of the question. To determine each element of the set of item-level correlations, the correlation evaluation model 340 may be configured to link the question feature expression 314 to a feature element corresponding to each textual item in the answer feature expression, and map the linked feature element to a corresponding correlation. This may be expressed as follows:

$$c_{j,k}^{Q,A^i} = \tanh((\tilde{a}_j^i \oplus \tilde{q}_k)^T u) \quad (3)$$

where, the tanh function is similar to that described in the formula (1), $\tilde{a}_j^i$ represents the vector coding corresponding to the $j^{th}$ textual item of the answer in the answer feature expression of the $i^{th}$ answer 114, and $\tilde{q}_k$ represents a vector coding corresponding to the $k^{th}$ textual item of the question in the question feature expression of the question 112, $\oplus$ represents linking/jointing of the vector coding, and $c_{j,k}^{Q,A^i}$ represents the correlation between the $k^{th}$ textual item of the question and the $j^{th}$ textual item of the answer. The correlation evaluation model 340 is configured to map the linked vector coding to the corresponding correlation using the set 343 u of parameters, where $u \in \Re^{2h}$.

For illustrative purposes, FIG. 3 illustrates that the feature element $\tilde{a}_1^1$ corresponding to the first textual item of the answer in the answer feature expression 324 is jointed with the feature element $\tilde{q}_1$ corresponding to the first textual item in the question feature expression 314 to obtain a jointed feature element 342. The jointed feature element 342 may be mapped using the set 343 u of parameters to obtain an element at an intersection of the first row and the first column of the set 345 of item-level correlations (denoted as $C^{Q,A^1}$) between the question 112 Q and the answer 114 $A^1$. The correlation among each textual item in the question 112 and in each answer 114 may be determined, thereby forming a set of item-level correlations $C^{Q,A^i}$ between the question 112 and the answer 114.

The correlation evaluation model 340 may be configured to weight the answer feature expression and the question feature expression using the set of item-level correlations to determine a measurement of correlation between the question 112 and the answer 114. In order to take features of the textual item having a high correlation into account, in some embodiments, based on the set of item-level correlations, the correlation evaluation model 340 may be configured to identify a vector encoding that is closely relevant to the answer 114 from the question feature expression 314 and identify a vector encoding that is closely relevant to the question 112 from the answer feature expression (e.g., the answer feature expression 324).

Depending on an arrangement of rows and columns of the set of item-level correlations, each row of the set of item-level correlations may indicate the correlation of each textual item of the answer 114 with respect to the question 112, while each column may indicate the correlation of each textual item of the question 112 with respect to the answer 114, as illustrated in the set 345 of item-level correlations $C^{Q,A^1}$ in FIG. 3. In an example, in another arrangement, each row of the set of item-level correlations may indicate the correlation of each textual item of the question 112 with respect to the answer, while each column may indicate the correlation of each textual item of the answer 114 with respect to the question 112.

Thus, in order to identify vector coding with a high correlation from the question feature expression and the answer feature expression, elements with a high correlation (e.g., element having a correlation higher than a first threshold and a second threshold) may be selected row by row and column by column from the set of item-level correlations. In other words, for each row of the set of item-level correlations, the elements having a high value in the row may be sequentially selected. For each column of the set of item-level correlations, the elements having a high value in the column may be sequentially selected. In this manner, a first subset (denoted as $\beta^Q$) of significant correlations of the question 112 with respect to the answer 114 and a second subset (represented as $\beta^{A^i}$) of significant correlations of the answer 114 with respect to the question 112 may be generated. In the example of FIG. 3, for the question 112 Q and the answer 114 $A^1$, by selecting the elements with a high value column by column, the first subset 346 of significant correlations may be determined, and by selecting the elements with a high value row-by-row to determine the second subset 347 of significant correlations.

In the selection of the elements with a higher value column by column and row-by-row, in some embodiments, an element with a maximum value may be selected from one row and/or one column each time. This is called row-by-row maximum pooling and column-by-column maximum pooling. In the exemplary arrangement of FIG. 3, by performing the maximum pooling on the set of item-level correlations by rows (i.e., portrait orientation) and by normalizing and performing probability distribution standardizing using the Softmax function, the first subset of significant correlations of the question 112 relative to the answer 114 may be determined, which may be denoted as follows:

$$\beta^Q = \text{softmax}(\max([c_{:,1}^{Q,A^i}, c_{:,2}^{Q,A^i}, c_{:,3}^{Q,A^i}, \ldots, c_{:,n}^{Q,A^i}])) \quad (4)$$

in a similar manner, the second subset of significant correlations of the answer 114 relative to the question 112 may be determined, which may be denoted as follows:

$$\beta^{A^i} = \text{softmax}(\max([c_{1,:}^{Q,A^i}, c_{2,:}^{Q,A^i}, c_{3,:}^{Q,A^i}, \ldots, c_{m,:}^{Q,A^i}])) \quad (5)$$

where, the Softmax function in equations (4) and (5) is similar to that described in formula (1).

The first subset of significant correlations may include elements, in the set of item-level correlations, indicating a high correlation between the question 112 and the answer 114 on the textual item level, while the second subset of significant correlations may include elements, in the set of item-level correlations, indicating a high correlation between the answer 114 and the question 112 on the textual item level. The computing device 102 may be configured to utilize the first subset of significant correlation to weight the question feature expression 314 and utilize the second subset of significant correlations to weight the answer feature expression (e.g., the answer feature expression 324), thereby highlighting the question features and the answer features having the high correlations. The weighted question feature expression and the weighted answer feature expression are linked to generate a measurement of correlation between the question 112 and the answer 114. Weighting and linking the question feature expression and the answer feature expression may be denoted as follows:

$$x^{Q,A^i} = \left(\sum_k \beta_k^Q q_k\right) \oplus \left(\sum_j \beta_j^{A^i} a_j^i\right) \quad (6)$$

where $x^{Q,A^i}$ represents the measurement of correlation between the question 112 and the $i^{th}$ answer 114. FIG. 3 illustrates the weighted question feature expression 348 of the question 112 and the weighted answer feature expression 349 of the answer 114 $A^1$. These two feature expressions are linked to generate the measurement of correlation 352 between the question 112 and the answer 114 $A^1$.

In embodiments of the present disclosure, for the question 112 and each of the answers 114 with respect to the question, the determined measurement of textual quality and the measurement of correlation are used together to determine the quality score for the current answer 114. In detail, for each question 114, the measurement of textual quality and the measurement of correlation are linked as an input of the quality evaluation model 350, which may be expressed as follows:

$$x^i = x^{Q,A^i} \oplus x^{A^i} \quad (7)$$

FIG. 3 illustrates an input $x^1$ obtained by linking the measurement of textual quality 338 of the answer 114 $A^1$ and the measurement of correlation 352 between the question 112 and the answer 114 $A^1$. The quality evaluation model 350 may be configured to determine the quality score of the answer 114 $A^i$ relative to the question 112 based on the input $x^i$. The quality evaluation model 350 may be configured to map the input $x^i$ to the corresponding quality score using the set of trained parameters.

In some embodiments, if there are multiple answers 114 with respect to the question 112, these answers 114 may be generated in an order or may be released in an order of the questions 112. These answers 114 may form a sequence based on any order, such as posting time, current presentation order, and the like. In the case of multiple answers, different answers may influence each other. For example, if a prior-ranked answer is determined to be a high-quality answer, there is a low probability that the subsequent similar answer is considered as a high-quality answer, thereby avoiding repeated presentation of the answers. In some cases, the answer generated later may be more likely to refer to the previous answer, and thus the probability of selecting the answer generated later as a high-quality answer may be high. If an answer contains content of multiple previous answers, the probability that the answer is a high-quality answer is high. Thus, in the case of multiple answers, the result of evaluation on the quality of other answers may affect the evaluation of the current answer.

In some embodiments, for a given answer 114, the quality evaluation model 350 may be configured to determine a candidate quality score of the answer 114 with respect to the question 112 based on the measurement of textual quality and the measurement of correlation, and adjust the candidate quality score based on the quality scores of other answers in the sequence, particularly the reference quality scores of other answers ranked before the current answer 114. The quality evaluation model 350 may be configured to determine the quality score of each answer sequentially. For the current answer 114, if there are other answers before the answer, the quality evaluation model 350 may be configured to obtain the determined quality scores of these answers as the reference quality scores. The quality evaluation model 350 may be also configured to obtain the probability of converting the reference quality score to the candidate quality score in a sequence comprising multiple ordered answers. The quality score may be determined based on the candidate quality score and the determined probability.

For other answers in the sequence, the quality evaluation model 350 may be configured to similarly determine the corresponding quality score. In some embodiments, the determination of the quality score may be implemented using a conditional random field (CRF) model. In such an embodiment, the determination of the quality score may be expressed as follows:

$$Pr(y^{1:L} \mid x^{A^{1:L}}, x^{Q,A^{1:L}}) \propto \exp\left(\sum_t O[y^{t-1}, y^t] + \sum_t g^t[y^t]\right) \quad (8)$$

where, $g^t[y^t] = \log(W^T x^t + b)$ where $Pr(y^{1:L} \mid x^{A^{1:L}}, x^{Q,A^{1:L}})$ represents the quality score of each of the L answers 114 with respect to the question 112 or a quality classification $y^t$, the set of parameters $W^T \in \Re^{3h \times z}$, $b \in \Re^z$, z indicates the categories of the quality classifications of the answer (for example, including two categories, i.e., a category of high-quality answers and a category of low-quality answers). $O \in \Re^{z \times z}$ represents a transfer matrix, and $O[y^{t-1}, y^t]$ represents a probability or a weight of converting the quality score $y^{t-1}$ of the answer t−1 to the quality score $y^t$ of the answer t, where the weight may be set in advance. As can be seen from formula (8), the quality scores between related answers may affect each other. By considering this effect, it is possible to accurately determine subsequent high-quality answers in a case where there are multiple answers, without causing repetition of high-quality answers.

A process that the learning network 300 is used to determine the quality of the answer in a case where the set of parameters of the learning network 300 is trained is described above. A process of training the learning network 300 will be described below. The purpose of the training is to continuously optimize the set of parameters of the learning network from the initial value to achieve a certain convergence condition (i.e., a learning objective). Training the learning network 300 can be implemented by the computing device 102. In an example, the learning network 300 may be trained by devices other than the computing device 102 and may be used by the computing device 102.

In the learning network 300 of FIG. 3, the set of parameters that needs to be trained includes: a set of parameters of the feature extraction models 310 and 320, the sets $v^A$ and $W^A$ of parameters of the textual quality evaluation model 330, the set u of parameters of the correlation evaluation model 340, and the sets $W^T$ and b of parameters of the quality evaluation model 350. In the learning network 300, some parameters may be automatically or manually set to be fixed, such as the dimension d of the vector expression of the textual item, the length n of the question text, the length m of the answer text, and the like. These parameters may be referred to as hyperparameters.

Training data used in training the learning network 300 may include multiple training questions, one or more answers for each training question, and true labels of these answers, i.e., labels indicating whether the answer is a high-quality answer or a quality score of the answer. At the beginning of the training processing, the set of parameters of the learning network 300 may be initialized. Random initialization may be used to set the initial value of each parameter. In some examples, for some parameters or models, pre-trained parameter values may be obtained as initial values.

In some embodiments, the vectorized expression of the textual item and/or a sub textual item may also be considered as a parameter to be optimized. In this way, the vectorized expression that is useful to determine the evaluation on the quality of the answer in the context of the evaluation on the quality of the answer may be determined through the training process. While optimizing the sets of parameters of various portions of the learning network 300, the vectorized expressions of the textual items and/or sub textual items may be also constantly updated and optimized to determine the final vectorized expression.

During the training process, multiple learning algorithms (e.g., a stochastic gradient descent algorithm, a back propagation algorithm) may be used to continuously optimize the set of parameters of the learning network 300, such that an error between a predicted degree and a target degree may be continuously reduced, and thus a value of a loss function may be continuously decreased. The loss function may be expressed as $\Sigma - y^{1:L} \log(\Pr(y^{1:L} | x^{A^{1:L}}, x^{Q, A^{1:L}}))$. If the loss function is convergent (e.g., the error is within a predetermined threshold range, or a value of the loss function is decreased to a small value or is minimized, or a predetermined number of iterations is reached) or the number of iterations reaches a preset number, the current parameter value of the learning network 300 may be determined as the set of parameters after the training.

According to embodiments of the present disclosure, an efficient and accurate automatic evaluation on the quality of the answer may be achieved, and an accurate answer may be determined by taking an interaction among different answers into account in a case of multiple answers.

Figure 4:
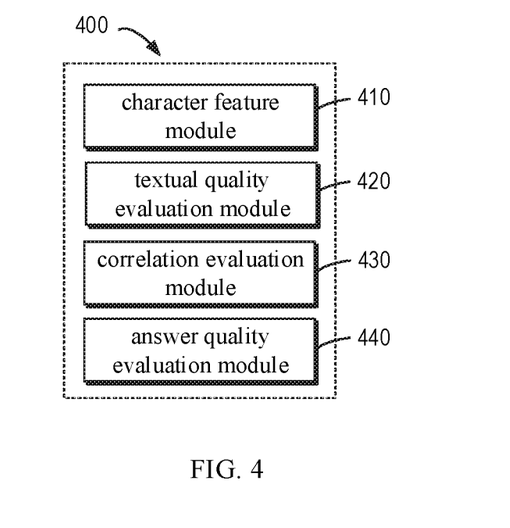
FIG. 4 is a block diagram illustrating an apparatus for evaluating quality of an answer according to embodiments of the present disclosure.

FIG. 4 is a block diagram illustrating an apparatus 400 for evaluating quality of an answer according to embodiments of the present disclosure. The apparatus 400 may be included in the computing device 102 of FIG. 1 or implemented as the computing device 102. As illustrated in FIG. 4, the apparatus 400 includes a feature extraction module 410, a textual quality evaluation module 420, a correlation evaluation module 430 and an answer quality evaluation module 440. The feature extraction module 410 may be configured to extract a question feature expression of a question and an answer feature expression of an answer with respect to the question. The question and the answer are in a form of text. The textual quality evaluation module 420 may be configured to determine a measurement of textual quality of the answer based on the answer feature expression. The correlation evaluation module 430 may be configured to determine a measurement of correlation on semantics between the question and the answer based on the question feature expression and the answer feature expression. The answer quality evaluation module 440 may be configured to determine a quality score of the answer with respect to the question based on the measurement of textual quality and the measurement of correlation on semantics.

In some embodiments, the answer may be divided into multiple textual items and the answer feature expression may include feature elements corresponding to the textual items. The textual quality evaluation module 420 may include an importance determination module, configured to determine an importance of each textual item in the context of the answer. In addition, the textual quality evaluation module 420 may further include a weight-based quality evaluation module, configured to determine the measurement of textual quality by weighting the feature elements in the answer feature expression using the importance.

In some embodiments, the correlation evaluation module 430 may include a textual item correlation determination module, configured to determine a set of item-level correlations between the answer and the question on a text-item level based on the answer feature expression and the question feature expression. The set of item-level correlations may include elements arranged in rows or columns. Each element may be used to indicate the correlation between a textual item of the answer and a textual item of the question. In addition, the correlation evaluation module 430 may further include a weight-based correlation evaluation module 430, configured to determining the measurement of correlation by weighting the answer feature expression and the question feature expression using the set of item-level correlations.

In some embodiments, the weight-based correlation evaluation module 430 may include a correlation selection module, a question feature weighting module, an answer feature weighting module and a linking module. The correlation selection module may be configured to generate a first subset of significant correlations of the question with respect to the answer and a second subset of significant correlations of the answer with respect to the question by selecting elements having a higher value than a predetermined threshold row by row and column by column, from the set of item-level correlations. The question feature weighting module may be configured to weight the question feature expression using the first subset of significant correlations. The answer feature weighting module may be configured to weight the answer feature expression using the second subset of significant correlations. The linking module may be configured to link the weighted question feature expression and the weighted answer feature expression to obtain the measurement of correlation.

In some embodiments, the correlation selection module may include a maximum pooling module, configured to generate the first subset of significant correlations and the second subset of significant correlations by applying maximum pooling on the set of item-level correlations row by row and column by column.

In some embodiments, the answer may be included in a sequence including multiple ordered answers with respect to the question. The answer quality evaluation module 440 may include: a candidate quality determination module, a reference quality obtaining module, a conversion probability determination module and a combination quality evaluation module. The candidate quality determination module may be configured to determine a candidate quality score based on the measurement of textual quality and the measurement of correlation. The reference quality obtaining module may be configured to obtain a reference quality score of the answer ranked before the answer in the sequence. The conversion probability determination module may be configured to determine a probability of converting the reference quality score to the candidate quality score with respect to the sequence. The combination quality evaluation module may be configured to determine the quality score based on the candidate quality score and the determined probability.

In some embodiments, the answer quality evaluation module 440 may be configured to determine the quality score using a trained conditional random field (CRF) model.

In some embodiments, the feature extraction module 410 may include: a first model extraction module and a second model extraction module. The first model extraction module may be configured to extract the question feature expression using a first long-short term memory (LSTM) model trained. The second model extraction module may be configured to extract the answer feature expression using a second LSTM model trained. The second LSTM model is different from the first LSTM model.

In some embodiments, the feature extraction module 410 may include a vectorization module, a question feature extraction module and an answer feature extraction module. The vectorization module may be configured to acquire a first vectorized expression of the question and a second vectorized expression of the answer. The question feature extraction module may be configured to extract the question feature expression based on the first vectorized expression. The answer feature extraction module may be configured to extract the answer feature expression based on the second vectorized expression.

Figure 5:
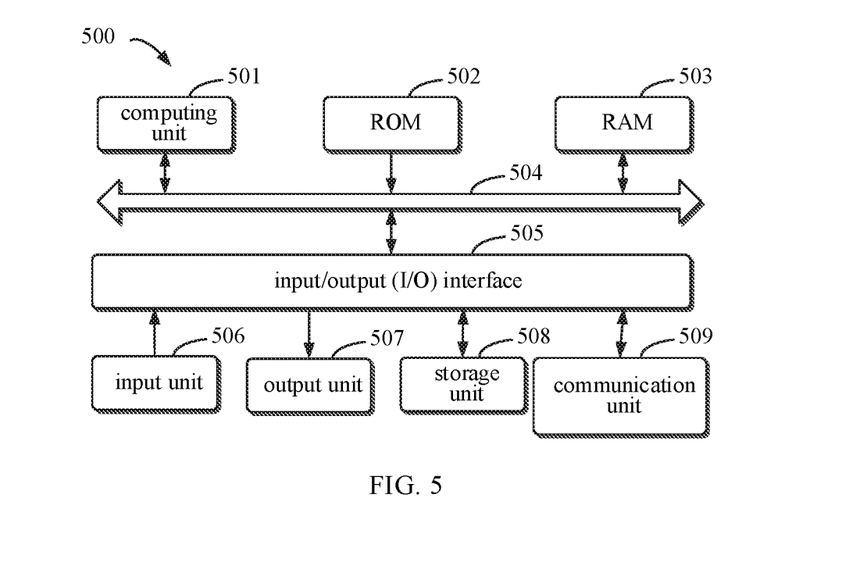
FIG. 5 is a block diagram illustrating a computing device capable of implementing embodiments of the present disclosure.

FIG. 5 is a block diagram of an example device 500 capable of implementing embodiments of the present disclosure. The device 500 may be used to implement the computing device 102 of FIG. 1. As shown, the device 500 may include a computing unit 501 that may perform various appropriate actions and processes according to computer program instructions stored in a read-only memory (ROM) 502 or computer program instructions loaded from the storage unit 508 to a random access memory (RAM) 503. In the RAM 503, various programs and data required for the operation of the device 500 can also be stored. The computing unit 501, the ROM 502, and the RAM 503 may be connected to each other through a bus 504. An input/output (I/O) interface 505 may be also coupled to bus 504.

A plurality of components in the device 500 are coupled to the I/O interface 505, including: input units 506, such as a keyboard, mouse; output units 507, such as various types of displays, speakers; storage units 508, such as disks, optical disks; and communication units 509 such as network cards, modems, wireless communication transceivers. The communication unit 509 allows the device 500 to exchange information/data with other devices over a computer network such as the Internet and/or various telecommunication networks.

The computing unit 501 can be a variety of general purpose and/or special processing components with processing and computing capabilities. Some examples of the computing unit 701 include, but are not limited to, central processing unit (CPU), a graphics processing unit (GPU), various specialized artificial intelligence (AI) computing chips, various computing units that run machine learning model algorithms, digital signal processor (DSP), and any suitable processor, controller, microcontroller. The computing unit 501 can perform the various methods and processes described above, such as the process 200. For example, in some embodiments, the process 200 can be implemented as a computer software program that is tangibly embodied in a machine readable medium, such as the storage unit 508. In some embodiments, some or all of the computer program may be loaded and/or installed onto the device 500 via the ROM 502 and/or the communication unit 509. One or more steps of the process 200 described above may be performed when a computer program is loaded into the RAM 503 and executed by the computing unit 501. Alternatively, in other embodiments, the computing unit 501 can be configured to perform the process 200 by any other suitable means (e.g., by means of firmware).

The functions described above herein may be performed, at least in part, by one or more hardware logic components. By way of example but not limitation, exemplary types of hardware logic components that may be used include: field programmable gate array (FPGA), application specific integrated circuit (ASIC), application specific standard product (ASSP), system on a chip (SOC), complex programmable logic device (CPLD).

Program code for implementing the methods of the present disclosure can be written in any combination of one or more programming languages. The program code may be provided to a general purpose computer, a special purpose computer or a processor or controller of other programmable data processing device such that the program code, when executed by the processor or controller, causes the functions/operations specified in the flowcharts and/or block diagrams to be implemented. The program code may execute entirely on the machine, partly on the machine, as part of the stand-alone software package, and partly on the remote machine or entirely on the remote machine or server.

In the context of the present disclosure, a machine-readable medium can be a tangible medium that can contain or store a program for use by or in combination with an instruction execution system, apparatus, or device. The machine readable medium can be a machine readable signal medium or a machine readable storage medium. A machine-readable medium can include, but is not limited to, an electronic, magnetic, optical, electromagnetic, infrared, or semiconductor system, apparatus, or device, or any suitable combination of the foregoing. More specific examples of machine readable storage medium may include electrical connections based on one or more wires, a portable computer disk, a hard disk, a random access memory (RAM), a read only memory (ROM), an erasable programmable read only memory (EPROM or flash memory), an optical fiber, a convenient compact disk read only memory (CD-ROM), an optical storage device, a magnetic storage device, or any suitable combination of the foregoing.

In addition, although the operations are depicted in a particular order, this should be understood to require that such operations be performed in the particular order shown or in sequential order, or that all illustrated operations should be performed to achieve the desired results. Multitasking and parallel processing may be advantageous in certain circumstances. Likewise, although several specific implementation details are included in the above discussion, these should not be construed as limiting the scope of the disclosure. Certain characters that are described in the context of separate embodiments can also be implemented in combination in a single implementation. Conversely, various characters that are described in the context of a single implementation can be implemented in a plurality of implementations, either individually or in any suitable sub-combination.

Although the subject matter has been described in language specific to structural characters and/or methodological acts, it is understood that the subject matter defined in the appended claims is not limited to the specific features or acts described above. Instead, the specific characters and acts described above are merely exemplary forms of implementing the claims.

What is claimed is:

1. A method for evaluating quality of an answer, comprising:

extracting a question feature expression of a question by a trained first long-short term memory (LSTM) model and an answer feature expression of an answer with respect to the question by a trained second LSTM model, the question and the answer being represented in a form of text and the second LSTM model being different from the first LSTM model;

determining a measurement of textual quality of the answer based on the answer feature expression;

determining a measurement of correlation on semantics between the question and the answer based on the question feature expression and the answer feature expression; and determining a quality score of the answer with respect to the question based on the measurement of textual quality and the measurement of correlation;

wherein determining a measurement of correlation comprises:

for each textual item contained in the answer, generating a group of first semantic correlations between each textual item contained in the question and the textual item contained in the answer, and obtaining multiple groups of first semantic correlations;

determining a first subset of significant semantic correlations by selecting a respective significant semantic correlation from each group of first semantic correlations, and weighting the question feature expression by the first subset of significant semantic correlations;

for each textual item contained in the question, generating a group of second semantic correlations between each textual item contained in the answer and the textual item contained in the question, and obtaining multiple groups of second semantic correlations;

determining a second subset of significant semantic correlations by selecting a respective significant semantic correlation from each group of second semantic correlations, and weighting the answer feature expression by the second subset of significant semantic correlations; and obtaining the measurement of correlation by linking the weighted question feature expression and the weighted answer feature expression.

2. The method of claim 1, further comprising:
dividing the answer into a plurality of textual items, the answer feature expression comprising feature elements corresponding to the plurality of textual items,
wherein, determining the measurement of textual quality comprises:
determining an importance of each textual item in context of the answer; and
determining the measurement of textual quality by weighting the feature elements of the answer feature expression with the importance.

3. The method of claim 1, further comprising:
determining a set of item-level semantic correlations between the answer and the question on a level of textual item based on the answer feature expression and the question feature expression, the set of item-level semantic correlations comprising elements arranged in rows and columns, each element being configured to indicate a semantic correlation between a textual item of the answer and a textual item of the question, a row of the set representing a group of second semantic correlations, and a column of the set representing a group of first semantic correlations.

4. The method of claim 1, wherein generating the first subset of significant semantic correlations and the second subset of significant semantic correlations comprises:
generating the first subset of significant semantic correlations and the second subset of significant semantic correlations by performing maximum pooling on the set of item-level semantic correlations row by row and column by column.

5. The method of claim 1, wherein the answer is comprised in a sequence comprising a plurality of ordered answers with respect to the question, and
determining the quality score comprises:
determining a candidate quality score based on the measurement of textual quality and the measurement of correlation;
obtaining a reference quality score of an answer ranked before the answer comprised in the sequence;

determining a probability of converting the reference quality score to the candidate quality score with respect to the sequence; and
determining the quality score based on the candidate quality score and the probability determined.

6. The method of claim 5, further comprising:
determining the quality score using a trained conditional random field (CRF) model.

7. The method of claim 1, wherein extracting the question feature expression and the answer feature expression comprises:
obtaining a first vectorized expression of the question and a second vectorized expression of the answer;
extracting the question feature expression based on the first vectorized expression; and
extracting the answer feature expression based on the second vectorized expression.

8. An electronic device, comprising:
one or more processors; and
a memory, configured to store one or more programs, wherein when the one or more programs are executed by the one or more processors, the one or more processors are caused to
extract a question feature expression of a question by a trained first long-short term memory (LSTM) model and an answer feature expression of an answer with respect to the question by a trained second LSTM model, the question and the answer being represented in a form of text and the second LSTM model being different from the first LSTM model;
determine a measurement of textual quality of the answer based on the answer feature expression;
determine a measurement of correlation on semantics between the question and the answer based on the question feature expression and the answer feature expression; and
determine a quality score of the answer with respect to the question based on the measurement of textual quality and the measurement of correlation;
wherein the one or more processors are configured to determine a measurement of correlation by:
for each textual item contained in the answer, generating a group of first semantic correlations between each textual item contained in the question and the textual item contained in the answer, and obtaining multiple groups of first semantic correlations;
determining a first subset of significant semantic correlations by selecting a respective significant semantic correlation from each group of first semantic correlations, and weighting the question feature expression by the first subset of significant semantic correlations;
for each textual item contained in the question, generating a group of second semantic correlations between each textual item contained in the answer and the textual item contained in the question, and obtaining multiple groups of second semantic correlations;
determining a second subset of significant semantic correlations by selecting a respective significant semantic correlation from each group of second semantic correlations, and weighting the answer feature expression by the second subset of significant semantic correlations; and
obtaining the measurement of correlation by linking the weighted question feature expression and the weighted answer feature expression.

9. The electronic device of claim 8, wherein the one or more processors are caused to:
    divide the answer into a plurality of textual items, the answer feature expression comprising feature elements corresponding to the plurality of textual items, and
    the one or more processors are caused to determine the measurement of textual quality by:
    determining an importance of each textual item in context of the answer; and
    determining the measurement of textual quality by weighting the feature elements of the answer feature expression with the importance.

10. The electronic device of claim 8, wherein the one or more processors are caused to:
    determine a set of item-level semantic correlations between the answer and the question on a level of textual item based on the answer feature expression and the question feature expression, the set of item-level semantic correlations comprising elements arranged in rows and columns, each element being configured to indicate a semantic correlation between a textual item of the answer and a textual item of the question, a row of the set representing a group of second semantic correlations, and a column of the set representing a group of first semantic correlations.

11. The electronic device of claim 8, wherein the one or more processors are caused to generate the first subset of significant semantic correlations and the second subset of significant semantic correlations by:
    generating the first subset of significant semantic correlations and the second subset of significant semantic correlations by performing maximum pooling on the set of item-level semantic correlations row by row and column by column.

12. The electronic device of claim 8, wherein the answer is comprised in a sequence comprising a plurality of ordered answers with respect to the question, and
    the one or more processors are caused to determine the quality score by:
    determining a candidate quality score based on the measurement of textual quality and the measurement of correlation;
    obtaining a reference quality score of an answer ranked before the answer comprised in the sequence;
    determining a probability of converting the reference quality score to the candidate quality score with respect to the sequence; and
    determining the quality score based on the candidate quality score and the probability determined.

13. The electronic device of claim 12, wherein the one or more processors are caused to:
    determine the quality score using a trained conditional random field (CRF) model.

14. The electronic device of claim 8, wherein the one or more processors are caused to extract the question feature expression and the answer feature expression by:
    obtaining a first vectorized expression of the question and a second vectorized expression of the answer;
    extracting the question feature expression based on the first vectorized expression; and
    extracting the answer feature expression based on the second vectorized expression.

15. A non-transitory computer readable storage medium having a computer program stored thereon, wherein when the computer program is executed by the processor, the method for evaluating quality of an answer is implemented, the method comprises:
    extracting a question feature expression of a question by a trained first long-short term memory (LSTM) model and an answer feature expression of an answer with respect to the question by a trained second LSTM model, the question and the answer being represented in a form of text and the second LSTM model being different from the first LSTM model;
    determining a measurement of textual quality of the answer based on the answer feature expression;
    determining a measurement of correlation on semantics between the question and the answer based on the question feature expression and the answer feature expression; and
    determining a quality score of the answer with respect to the question based on the measurement of textual quality and the measurement of correlation;
    wherein the one or more processors are configured to determine a measurement of correlation by:
    for each textual item contained in the answer, generating a group of first semantic correlations between each textual item contained in the question and the textual item contained in the answer, and obtaining multiple groups of first semantic correlations;
    determining a first subset of significant semantic correlations by selecting a respective significant semantic correlation from each group of first semantic correlations, and weighting the question feature expression by the first subset of significant semantic correlations;
    for each textual item contained in the question, generating a group of second semantic correlations between each textual item contained in the answer and the textual item contained in the question, and obtaining multiple groups of second semantic correlations;
    determining a second subset of significant semantic correlations by selecting a respective significant semantic correlation from each group of second semantic correlations, and weighting the answer feature expression by the second subset of significant semantic correlations; and
    obtaining the measurement of correlation by linking the weighted question feature expression and the weighted answer feature expression.

16. The non-transitory computer readable storage medium of claim 15, wherein the method further comprises:
    dividing the answer into a plurality of textual items, the answer feature expression comprising feature elements corresponding to the plurality of textual items,
    wherein, determining the measurement of textual quality comprises:
    determining an importance of each textual item in context of the answer; and
    determining the measurement of textual quality by weighting the feature elements of the answer feature expression with the importance.

* * * * *